(No Model.)

J. H. C. WATTS.
Tips for Electric Conductors.

No. 230,090.　　　　　　　　Patented July 13, 1880.

Witnesses,
Jos. Wilkins.
L. H. Barclay.

Inventor,
J. H. C. Watts.
by R. D. Williams.
Attorney.

UNITED STATES PATENT OFFICE.

J. HENRY C. WATTS, OF BALTIMORE, MARYLAND.

TIP FOR ELECTRIC CONDUCTORS.

SPECIFICATION forming part of Letters Patent No. 230,090, dated July 13, 1880.

Application filed May 26, 1880. (No model.)

*To all whom it may concern:*

Be it known that I, J. HENRY C. WATTS, of Baltimore city, State of Maryland, have invented certain new and useful Improvements in Tips for Electric Conductors; and I hereby declare the same to be fully, clearly, and exactly described as follows, reference being had to the accompanying drawings, in which—

Figure 1:
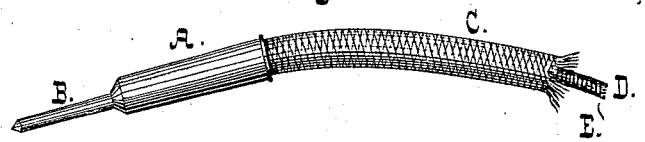
Figure 2:
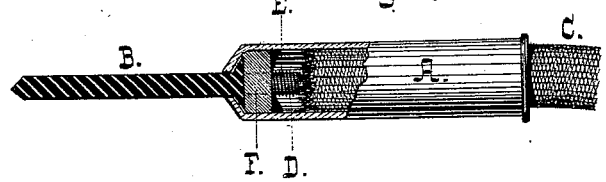

Figure 1 is a side view of the device; and Fig. 2 is a central sectional view on an enlarged scale, showing the internal construction.

My invention has reference to tips for flexible electric conductors; and it has for its object to furnish a device of that class affording increased facility for attaching the conductor thereto, and which admits of the ready separation of the tip from the conductor when desired.

Devices of this kind have generally heretofore consisted of a sheet-metal shell through which a pin having a ring in lieu of a head was thrust, the metallic core of the conductor being first attached to the ring. The shell was finally crimped or compressed, so as to hold the parts firmly together. The objection to this form of device is, that should the conductor break, as frequently occurs, the tip must be thrown away and a new one attached to the new conductor, it being impossible to separate the parts of the tip so as to admit of it being used again.

In the device about to be described I afford facility for removing the tip from the conductor, so that the same tip may be used on the new conductor, while incidentally securing greater strength of attachment of the parts and insuring the setting up of electric connection.

In the accompanying drawings, A is a sheet-metal shell or ferrule cheaply spun or struck up and having a hole in its tip. B is a common headed escutcheon nail or tack, and C is the flexible conductor having a core, D, about which the metallic conductor E is wound.

In connecting the parts the tack B is thrust through the hole in the end of the shell A, and a small piece of soft solder, F, is laid upon the head of the tack. The end of the core D is then laid bare and the conductor is pushed down in the shell until the end of the core comes against the head of the pin. The tip is then held for a moment in a flame, so as to melt the solder, whereby the tack is firmly united to the shell, and the solder flowing upon the metallic core E sets up electric connection beyond peradventure.

By preference the solder is used in the form of small globules or shot, which admit of the core being brought into actual contact with the pin-head, though this is not absolutely essential.

Now, should it be desired to separate the parts in case the conductor breaks, the tip is held in a flame to melt the solder, when the core is drawn out of the shell and the new conductor is attached in the manner just described, a little fresh solder being added to take the place of that removed by the core.

It will be seen that the device possesses great advantages over others of its class in the facility it affords for attaching the conductor and in separating the conductor from the shell when desired, and in point of cheapness it leaves nothing to be desired.

The shells may be struck up nearly as cheaply as percussion-caps, and the tacks B are staple articles of commerce.

Instead of tacks or pins I may make use of sections of wire, securing them in place in the shells in the manner hereinbefore described.

What I claim is—

1. A flexible electric conductor united to its tip by solder, which secures together the terminal shell and separate tip, as set forth.

2. The combination, with the shell A, of the tack B, solder F, and flexible conductor C, substantially as set forth.

J. HENRY C. WATTS.

Witnesses:
R. D. WILLIAMS,
THOMAS OWINGS.